J. TEN D. KOOLMAN & W. PONNDORF.
HOP EXTRACTING APPARATUS.
APPLICATION FILED SEPT. 6, 1912.

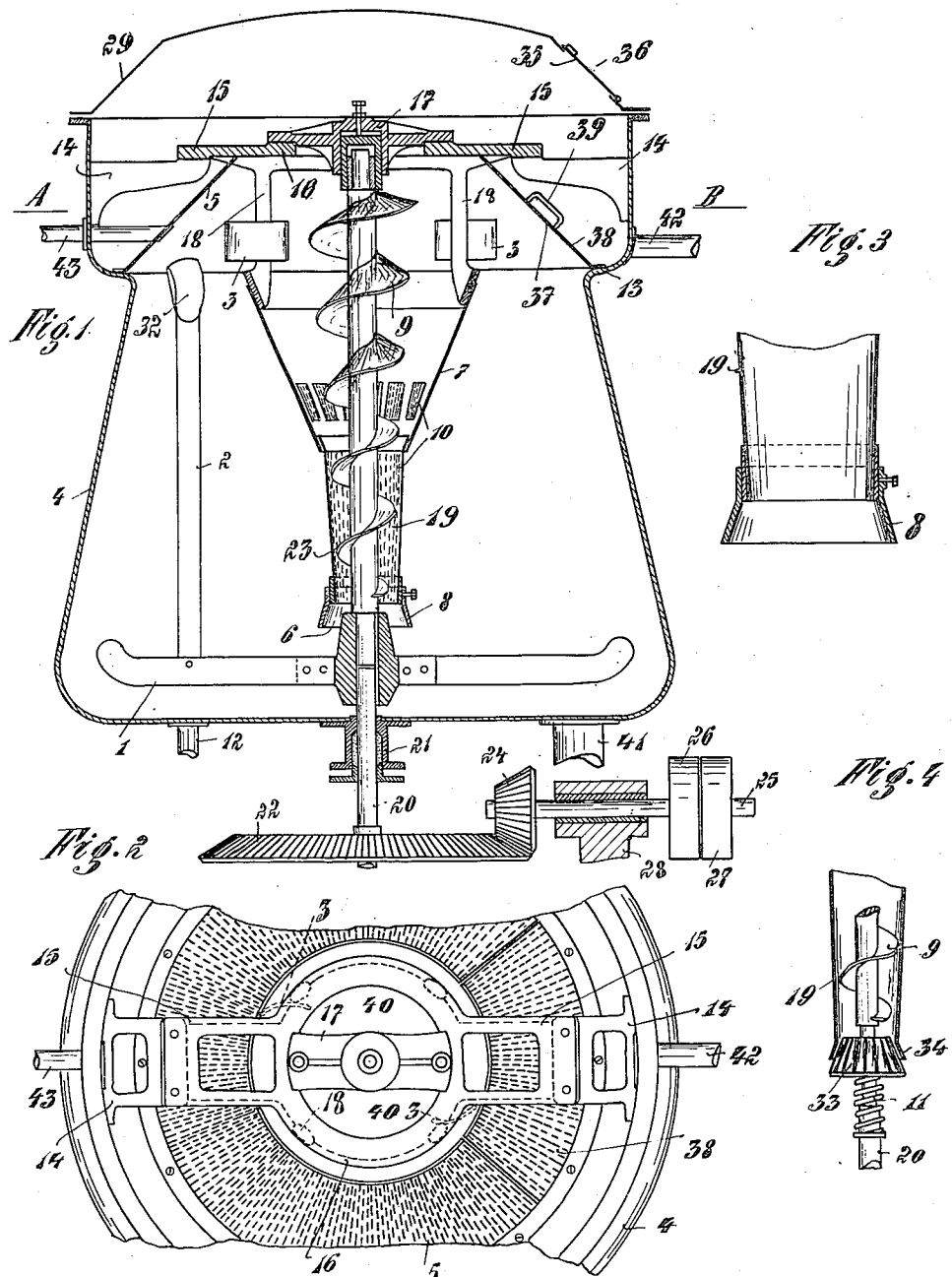

1,055,475.

Patented Mar. 11, 1913
2 SHEETS—SHEET 2.

UNITED STATES PATENT OFFICE.

JACOBUS TEN DOORNKAAT KOOLMAN AND WILHELM PONNDORF, OF CASSEL, GERMANY.

HOP-EXTRACTING APPARATUS.

1,055,475.  Specification of Letters Patent.  Patented Mar. 11, 1913.

Application filed September 6, 1912. Serial No. 718,981.

*To all whom it may concern:*

Be it known that we, JACOBUS TEN DOORNKAAT KOOLMAN and WILHELM PONNDORF, citizens of the Empire of Germany, residing at Cassel, in the Empire of Germany, have invented a new and useful Hop-Extracting Apparatus, of which the following is a specification.

Our invention relates to an apparatus for separating the extractive matter from hops, in which apparatus the essence or principle is separated from the hops in a more complete and satisfactory manner, than was hitherto possible.

We will now proceed to describe our invention with reference to the accompanying drawings, in which—

Figure 5:
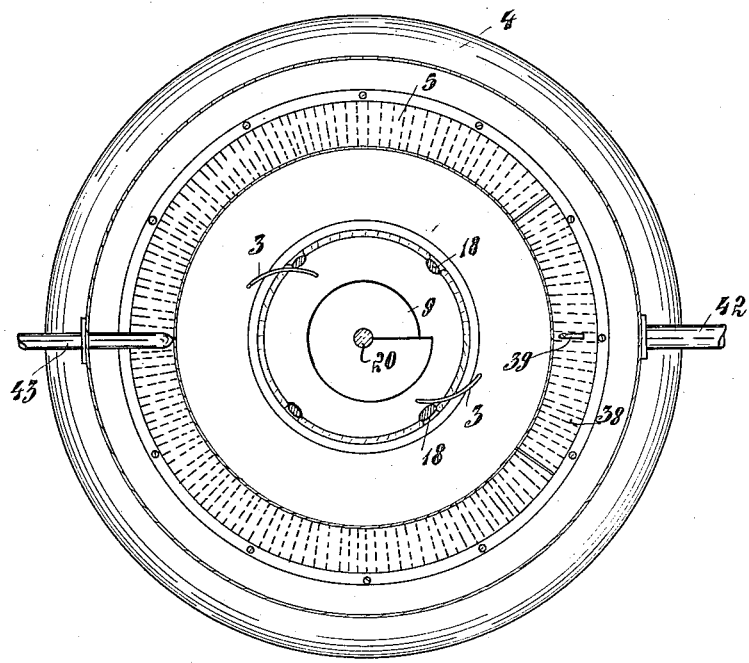
Figure 6:
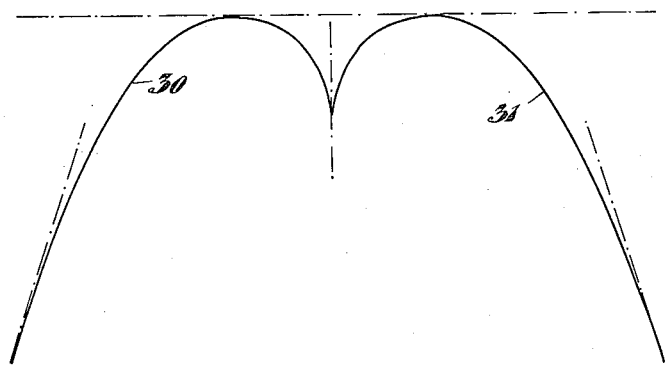

Figure 1 is a vertical central section through the apparatus, Fig. 2 is a plan view of the same, the cover being removed and parts being broken away, Fig. 3 shows on an enlarged scale the lower end of the central tube and an adjustable sleeve for regulating the downward passage of the hop strobiles, Fig. 4 shows a modification of this regulating device, Fig. 5 is a horizontal section through the apparatus on the line A—B in Fig. 1, and Fig. 6 illustrates the upper surface of the theoretical solid of revolution described by the liquid in the apparatus.

Similar characters of reference refer to similar parts throughout the several views.

4 is a round vessel which for the greater lower part is conical and tapers upward and for the upper part is cylindrical and has a larger diameter forming a shoulder 13. The vessel 4 is closed with a suitable cover 29, which is provided with a hole 35, that can be closed with a turnable cover 36. On the shoulder 13 is fastened an annular conical, upwardly tapering sieve 5, which beneath the hole 35 is provided with a hole 37. This hole 37 is normally closed with a sieve piece 38, which can be taken off by means of a handle 39. Two opposite brackets 14, 14 are provided on the inside of the upper vessel part for supporting two arms 15, 15 of a central annular disk 16, which is bridged over by a bearing 17 of any known construction. It will be seen, that the sieve 5 and the disk 16 cover the lower part of the vessel 4. The two openings 40, 40 left in the disk 16 on both sides of the bearing 17 permit the air to freely circulate in the apparatus. Also fresh air can be admitted through the two openings 40, 40 into the lower part of the apparatus, after the cover 36 has been opened. The disk 16 has several (here four) pendent arms 18, 18, from which a funnel 7 is suspended. At the lower end the funnel 7 is connected with a tube 19, which slightly tapers downward and carries at the lower end a vertically adjustable sleeve 8, that diverges downward. The lower part of the funnel 7 and the tube 19 are provided with slits or perforations 10, so that they serve as sieves.

A shaft 20 is mounted to turn in the upper bearing 17 and in a stuffing-box 21 provided in the center of the bottom of the vessel 4. The shaft 20 has fastened on it a helical blade 9, an agitator 1 and a large bevel wheel 22 below the vessel 4. The helical blade 9 slightly tapers downward and occupies only the central part of the funnel 7 and is in close proximity of the upper part of the tube 19, but gradually decreases in diameter downward, so that a clearance 23 is left between the outer edge of the blade 9 and the inside of the tube 19, which clearance gradually increases downward. The agitator 1 is shown as carrying one vertical arm 2 which is provided at the upper end with a scoop 32. The scoop 32 may turn its concave face to a point on the outside of the funnel 7, so that it is substantially inclined to the vertical plane of the agitator 1. On two opposite arms 18, 18 two ladles 3, 3 of the shape shown in Fig. 5 are preferably fastened. The large bevel wheel 22 is to be driven from without in any known manner, for example by means of a small bevel wheel 24 and a shaft 25 carrying fast and loose pulleys 26, 27 and turning in a suitable bearing 28.

The vessel 4 is at its bottom connected with a tube 12 for admitting cold water and also with another tube 41 for leading off the water. The vessel 4 is also provided with a tube 42 for leading off the extract. A tube 43 is attached to the upper cylindrical part of the vessel 4 and extends through a hole in the sieve 5 to some point between the lower part of the vessel 4 and the periphery of the top of the funnel 7.

The extracting apparatus operates as follows: The cover 36 is opened and the sieve piece 38 is taken off. Then hops are introduced into the lower part of the vessel 4, after which the sieve piece 38 is replaced and the cover 36 is closed. Thereupon boiling water is introduced into the lower part of the vessel 4 through the tube 43 and allowed to act for some time upon the hops so as to soften them by soaking, whereby they become supple. Afterward the belt is shifted from the loose pulley 26 to the fast one 27 for starting the apparatus. The agitator 1 will carry along with it the hops, and set in conjunction with the vertical arm 2 the liquid to rotate. As is well known, in the cylindrical drum of a centrifugal machine the upper surface of the liquid forms a paraboloid. The agitator 1 and its arm 2 with the scoop 32, however, throw the liquid upward along the conical walls of the vessel 4 and the conical sieve 5, that is along the surface of a paraboloid 30 in Fig. 6, so that the liquid flows inward and heavily falls into the funnel 7 along the surface of the solid 31 of revolution in Fig. 6. It is essential, that the agitator 1 sweeps the whole bottom of the vessel and that the scoops 32 and 3, 3 positively guide the hops into the funnel 7. Without the scoops 32 and 3, 3 the hops would remain in proximity of the outside of the funnel 7 and would not pass into the funnel. The hops are most bulky and would not at once partake in the motion of the liquid, if the long agitator 1 were not provided, so that it would take a long time before the hops were put into proper circulation with the liquid. Without the ladles 3, 3 also the hops would require about an hour, before they are put into circulation. Where so preferred, the agitator 1 may carry more than one vertical arm 2 so as to facilitate its work. Of course the motion of the liquid with the hops would be more facilitated, if there were no edges between the conical walls of the vessel 4 and the conical sieve 5 and between the sieve 5 and the disk 16, as is shown in Fig. 1.

The violent shock produced by the liquid heavily falling on the blade 9 will partly divide the hop strobiles. The hop strobiles moving down in the lower part of the funnel 7 and in the tube 19 will be partly freed from the liquid flowing through the perforations 10 and be compressed, in other words the hop strobiles will gradually form lumps. As the liquid passes downward at a greater speed than would correspond to the longitudinal relative speed of the helical blade 9, the lumps of hop strobiles will be again divided and forced outward through the annular passage 6 between the lower edge of the sleeve 8 and the nave of the agitator 1.

Where so preferred, the adjustable sleeve 8 may be replaced by an upwardly tapering valve 33 (Fig. 4) longitudinally movable on the shaft 20 and pressed upward by a helical spring 11 against a downwardly diverging projection 34 of the tube 19. Thereby the motion of the hop strobiles in the tube 19 will be retarded, so as to enable the helical blade 9 to compress the hop strobiles and to force them out. In this manner the hops are first pushed downward and then so to say rolled under pressure. It is to be noted, that as the tube 19 slightly tapers down, the liquid will be better squeezed out of the hop strobiles through the perforations 10. The hop strobiles are at the same time loosened and separated from their ribs and stems, without however destroying the ribs and stems and extracting from them the substances objectionable to the taste of the beer. Of course during the work of the apparatus the liquid is repeatedly circulated with the hop strobiles through the apparatus, whereby the hop strobiles are subjected to the action of the extracting liquid. It is unnecessary to specially heat the extract, which maintains a temperature of about 75° centigrade. This temperature is most favorable for the resulting beer. After the treatment of the hops is finished, the apparatus is stopped and cold water is admitted to the vessel 4 through the tube 12, which cold water rinses the rest of the extractive matter out of the hop strobiles and raises the extract upward toward the level, from where the extract is discharged through the tube 42. Preferably the temperature of the cold water should be 4° centigrade; however, it may also be a little higher. The removal of the extract from the hop strobiles by means of the cold water is very essential, since even after the most severe treatment the hops still contain much extract, which can now be easily removed by means of the cold water.

The extracting apparatus can be varied without departing from the spirit of our invention.

We claim:

1. In a hop extracting apparatus, the combination with a round vessel, of a vertical central shaft mounted to turn in said vessel, an agitator on said shaft adapted to sweep the whole bottom of said vessel, a helical blade on said shaft above said agitator, a funnel suspended from said vessel and surrounding the upper part of said helical blade, a perforated tube attached to the lower end of said funnel and surrounding the lower part of said helical blade while leaving an annular passage above said agitator, means for positively guiding the agitated liquid with the hop strobiles upward along the walls of said vessel and inward into said funnel, and means for driving said shaft.

2. In a hop extracting apparatus, the combination with a round vessel, of a vertical central shaft mounted to turn in said vessel, an agitator on said shaft adapted to sweep the whole bottom of said vessel, a helical blade on said shaft above said agitator slightly tapering downward, a funnel suspended from said vessel and surrounding the upper part of said helical blade, a perforated tube attached to the lower end of said funnel and surrounding the lower part of said helical blade while leaving an annular passage above said agitator, means for admitting hops to said vessel, means for introducing hot water into said vessel, means for positively guiding the agitated liquid with the hop strobiles upward along the walls of said vessel and inward into said funnel, means for admitting cold water to said vessel at the bottom, means for leading off the extract from said vessel, means for leading off the water from the bottom of said vessel, and means for driving said shaft.

3. In a hop extracting apparatus, the combination with a round vessel tapering upward, of a concave cover covering said vessel, a concave sieve beneath said concave cover, a vertical central shaft mounted to turn in said vessel, an agitator on said shaft adapted to sweep the whole bottom of said vessel and comprising arms reaching upward, the arms of said agitator having at the upper end scoops, a helical blade on said shaft above said agitator slightly tapering downward, pendent arms on said concave sieve, a funnel suspended from said pendent arms and surrounding the upper part of said helical blade, a perforated tube attached to the lower end of said funnel and surrounding the lower part of said helical blade while leaving an annular passage above said agitator, ladles on said pendent arms above said funnel, means for admitting hops through said cover and said sieve to said vessel, means for introducing hot water into said vessel, said agitator being adapted to positively guide the liquid with the hop strobiles upward along the walls of said vessel and said sieve and said ladles being adapted to positively guide the liquid with the hop strobiles inward into said funnel, means for admitting cold water to said vessel at the bottom, means for discharging the extract from said vessel, means for leading off the water from the bottom of said vessel, and means for driving said shaft.

4. In a hop extracting apparatus, the combination with a round vessel comprising a lower conical part tapering upward and an upper part of larger diameter, of a cover for covering the upper part of said vessel and having a hole, a shutter for the hole of said cover, a conical annular sieve covering the lower part of said vessel and tapering upward and having a detachable piece, a concentric annular disk for covering the outer part of the opening in said conical annular sieve, a bearing bridging over the opening of said annular disk, a stuffing box in the center of the bottom of said vessel, a vertical shaft mounted to turn in said bearing and said stuffing box, an agitator on said shaft within said vessel adapted to sweep the whole bottom and comprising arms reaching upward, the arms of said agitator having at the upper ends scoops, a helical blade on said shaft above said agitator slightly tapering downward, pendent arms on said annular disk, a funnel suspended from said pendent arms and surrounding the upper part of said helical blade, a perforated tube attached to the lower end of said funnel and surrounding the lower part of said helical blade while leaving an annular passage above said agitator, scoops on said pendent arms above said funnel, said shutter and said detachable sieve piece being adapted to admit hops to the lower part of said vessel, means for introducing hot water through said annular sieve into the lower part of said vessel, said agitator being adapted to positively guide the liquid with the hop strobiles upward along the walls of said vessel and said annular conical sieve and said scoops being adapted to positively guide the liquid with the hop strobiles inward into said funnel, means for admitting cold water to said vessel at the bottom, means for discharging the extract from said vessel, means for leading off the water from the bottom of said vessel, and means for driving said shaft.

In testimony whereof we affix our signatures in presence of two witnesses.

JACOBUS ten DOORNKAAT KOOLMAN.
WILHELM PONNDORF.

Witnesses:
SOPHIE ENGELAND,
FRITZ HEMMERICH.